Figure 1:
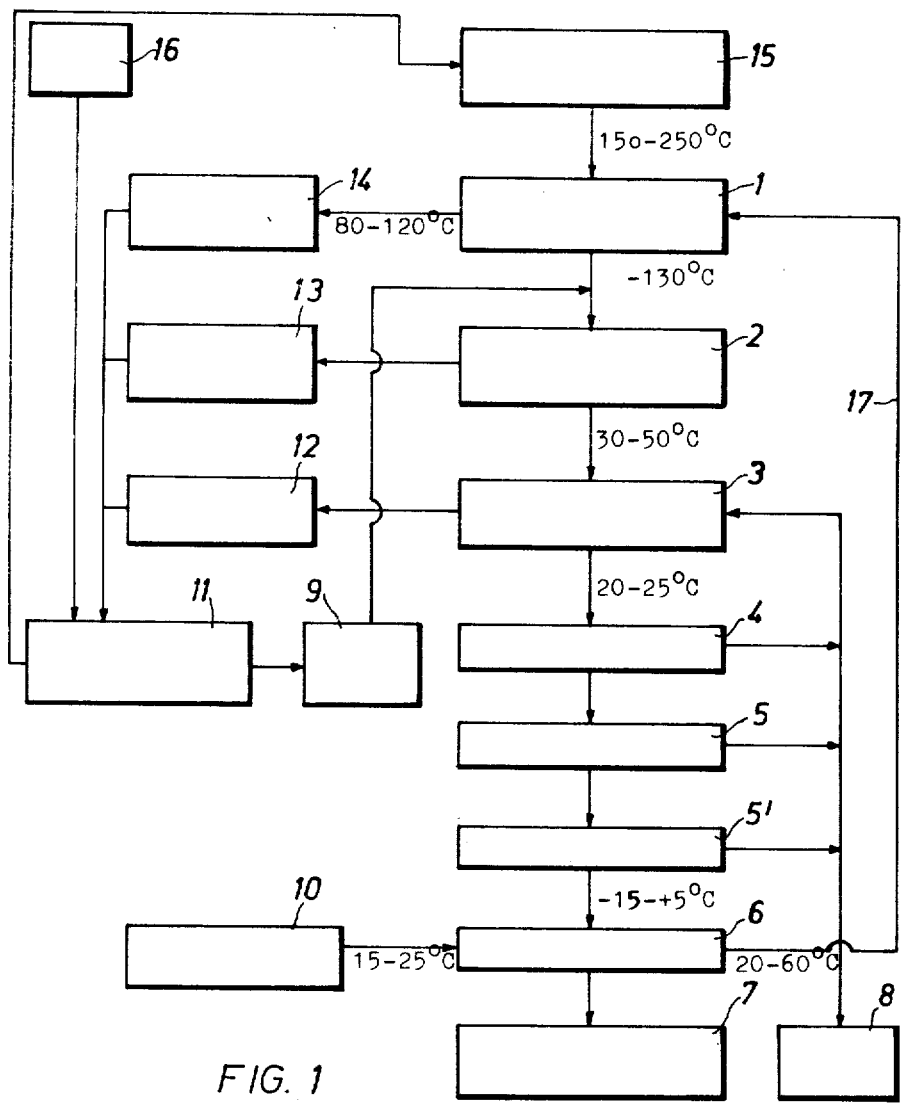

United States Patent [19]

Schabacher et al.

[11] 3,919,399
[45] Nov. 11, 1975

[54] PROCESS FOR PURIFYING AND CONDENSING REACTION GASES IN THE PRODUCTION OF HYDROFLUORIC ACID

[75] Inventors: Werner Schabacher; Hermann Rohe, both of Leverkusen; Wolfgang Keller, Bergisch-Gladbach-Paffrath; Bernhard Spreckelmeyer, Leverkusen, all of Germany

[73] Assignee: Bayer Aktiengesellschaft, Germany

[22] Filed: Feb. 26, 1973

[21] Appl. No.: 335,596

[30] Foreign Application Priority Data
Mar. 2, 1972 Germany.................... 2209960

[52] U.S. Cl. ............... 423/488; 423/240; 423/341; 423/484; 423/485; 55/71
[51] Int. Cl.² ............................................. C01B 7/22
[58] Field of Search ........... 423/485, 484, 483, 488, 423/490, 240; 55/71

[56] References Cited
UNITED STATES PATENTS

| | | | |
|---|---|---|---|
| 1,091,795 | 3/1914 | Bidtel.......................... | 423/490 X |
| 1,960,347 | 5/1934 | Osswald et al................. | 423/484 |
| 2,047,210 | 7/1936 | Lawrence...................... | 423/485 |
| 2,456,509 | 12/1948 | Hopkins, Jr. et al. .......... | 55/71 X |
| 2,507,605 | 5/1950 | Lopker et al.................. | 423/483 |
| 2,753,245 | 7/1956 | Mitchell et al................ | 423/485 |
| 3,004,829 | 10/1961 | Boyle et al.................... | 423/485 |
| 3,027,227 | 3/1962 | Coxey.......................... | 423/490 |
| 3,110,562 | 11/1963 | Hinkle, Jr. ................... | 423/483 X |
| 3,167,391 | 1/1965 | Swinehart..................... | 423/485 |
| 3,326,634 | 6/1967 | Porter et al................... | 423/484 |
| 3,725,536 | 4/1973 | Gentilli........................ | 423/485 |

FOREIGN PATENTS OR APPLICATIONS

| | | | |
|---|---|---|---|
| 1,442,979 | 8/1970 | Germany .................... | 423/488 |
| 1,442,978 | 11/1968 | Germany .................... | 423/240 |

OTHER PUBLICATIONS

Chemical Abstracts, Vol. 66, 1967, p. 5428.

*Primary Examiner*—Edward Stern
*Attorney, Agent, or Firm*—Connolly and Hutz

[57] ABSTRACT

The present invention relates to a process for recovering hydrogen fluoride from the gaseous reaction product of a metal fluoride with sulfuric acid by washing the gaseous product in a first stage with concentrated sulfuric acid and thereby cooling the gas to a temperature of about 60° to 130°C, cooling said gas by indirect heat exchange with water to a temperature of about 30° to 50°C in a second stage and in a third stage by direct heat exchange with pure hydrofluoric acid to a temperature of about 20° to 25°C, condensing hydrogen fluoride in the cooled gaseous product of the third stage in at least two additional stages and recovering condensed hydrogen fluoride.

5 Claims, 4 Drawing Figures

PROCESS FOR PURIFYING AND CONDENSING REACTION GASES IN THE PRODUCTION OF HYDROFLUORIC ACID

Hydrofluoric acid is generally produced on an industrial scale by reacting fluorspar with sulphuric acid in a rotary kiln at a temperature in the range of from about 150° to 350°C. In addition to dust-form constituents, the crude gases which leave the kiln contain hydrogen fluoride predominantly and contain water vapour, sulphuric acid or droplets of sulphuric acid, sulphur dioxide, silicon tetrafluoride and inert gases as impurities. High-purity hydrofluoric acid can be obtained from these crude gases by two methods. In a first method, the crude gases are condensed and purification is carried out by fractional distillation and/or condensation. In a second method, the reaction gases are freed from all their impurities before condensation of the hydrofluoric acid. There are several possible modifications to both processes.

The present invention relates to an economic process for producing high-purity hydrofluoric acid by separating off the impurities before the actual condensation stage.

U.S. Pat. No. 2,507,605 relates to a process for treating reaction gases from the reaction of fluorspar with sulphuric acid, in which the reaction gases are initially dried with concentrated sulphuric acid at a temperature above 90°C. The resulting dried gases are then compressed, heat being dissipated by external cooling with water in such quantities that at least some of the HF present in the gas is condensed. The HF still present in the residual gas is then liquefied by indirect heat exchange with the already condensed HF. The HF vapour formed during cooling is returned to the condensation stage. The residual gas from the second condensation stage is washed with cold sulphuric acid which is then used to dry the residual gases.

German Auslegeschrift No. 1,261,835 describes a process in which the crude gases are passed successively through a dust separator, a dust chamber, a catalytic sulphur purifier, a cooler, a washer in which the fluorosulphonic acid is removed and, finally, through a cooler. In the washer the gases are treated with the condensates from the dust chamber, the sulphur purifier and the coolers, whilst the dust separator is charged with the condensate from the washer, the condensate from the dust separator finally being delivered to the reaction vessel.

U.S. Pat. No. 3,004,829 describes a process in which the hydrofluoric acid is condensed and at the same time purified in three component stages. In this process, the crude gases are intially delivered through a washer to a precondensation stage in which the gases are cooled to a temperature of from 65° to 72°F. The condensate thus formed is delivered to the washer. The cooled gases are then delivered to a first condensation and distillation column from the upper end of which purified distillate is removed, which can then be worked up into pure concentrated hydrofluoric acid in a second condensation and distillation stage. The sump product from the first column is also delivered to the washer, whilst the head products of both columns, essentially containing the inert gases and other readily volatile impurities, are washed with sulphuric acid. The process according to German Auslegeschrift No. 1,567,778 works on the same principle, whilst DAS No. 1,265,723 and DOS No. 2,005,573 relate to special embodiments of individual members of the process stages described above. According to DAS No. 1,265,723, separator, the gases escaping from the reactor are purified before their introduction into the first condensation stage by spraying in a liquid consisting of approximately 85% of sulphuric acid, 12.5 % of hydrofluoric acid and 2.5 % of water, some of the liquid sprayed in being removed from the purification stage by partial condensation of the gases. DOS No. 2005,573 relates to a process known per se for separating sulphur in which the washed gases are passed through a sublimate separator which can indirectly be heated and cooled. In this sublimate suparator, the crude gases are cooled to the dew point of sulphur without any condensation of hydrogen fluoride. The sulphur separated can be removed again by heating the column.

We have now found a process for working up crude gases containing hydrogen fluoride from the reaction of metal fluorides with sulphuric acid or oleum in a purifying and condensing installation following the reactor which is distinguished by the fact that the hot gases having a temperature of 150°–250°C leaving the reaction zone are washed in a first stage with concentrated, i.e. 95 to 99% by weight, sulphuric acid (washing acid) heated to a temperature of from about 50° to 120°C, and thereby cooled to a temperature of from about 60° to 130°C, preferably from 70° to 90°C; cooled to a temperature of around 30° to 50°C in a second stage by indirect heat exchange with water; cooled to a temperature of around 20° to 25°C in the third stage by direct heat exchange with pure hydrofluoric acid (98–99.9 % by weight HF) with a ratio of liquid HF to gaseous HF from 0.5 to 1, preferably of at most substantially 1 : 1, condensed in at least two stages in the fourth and fifth stages and freed in the sixth and seventh stages from uncondensed residual HF and $SiF_4$, substantially anhydrous hydrogen fluoride accumulating as the condensate, and the condensates from the second and third stages are combined with the washing acid from the first stage and, following the addition of oleum, are delivered to the reaction vessel.

The $H_2SO_4$-wash carried out in the first stage can also take the form of a two-stage countercurrent wash. In the first washer (stage 1 $a$), the acid is circulated by pumping without being cooled, assuming a temperature of from 100° to 140°C, whilst the gas leaves the washer with a temperature of from 90° to 160°C. In the second washer (stage 1 $b$), the recirculated acid is indirectly cooled with water, preferably with the water issuing from stage 2, to a temperature of from 40° to 70°C, the issuing gas having a temperature of from 50° to 90°C.

It has been found that, by virtue of the measures according to the invention and, more particularly, by virtue of the proposed sequence of washing and cooling stages, it is possible to obtain an extremely pure, high-percentage hydrofluoric acid containing approximately 99.95 % by weight of HF, in a very economical manner, i.e. with very little outlay in terms of energy.

More particularly, the process is distinguished by the fact that an $H_2O$-cooler 2 operated with the cooling water coming from another $H_2O$-cooler 4 is installed between the $H_2SO_4$- washer 1 and the HF-washer 3, by the fact that the washing solutions and condensates accumulating in the washing and cooling stages 1 to 3 are removed from the purification system and by the fact that this washing acid and the condensates are subsequently used for preparing the charging acid, this operation being accompanied by the liberation of gaseous hydrofluoric acid which is subsequently returned to the purification and condensation system so that the quantity of HF circulating in the system as a whole is reduced to a minimum.

In contrast, the process described in U.S. Pat. No. 2,507,605 uses an elaborate compression stage (with indirect water cooling) and indirect cooling through the evaporation of HF.

In the process described in DAS No. 1,261,835, the condensates and washing acids from three preceding stages are used as washing liquid for the following washers, the washing acid accumulating in this case being returned to the dust separator.

In the process described in U.S. Pat. No. 3,004,829, purification is carried out after a preliminary washing and a precondensation stage by a two-stage distillation; in this case, too, condensates from the following stages are returned to the system and used as washing liquid in preceding stages.

Nor is an $H_2O$-cooler installed between the $H_2SO_4$-washer and a packed column charged with condensates from the first condensation stages in the process according to the DAS No. 1,567,778; all the washing liquids and condensates are recycled.

One embodiment of the process according to the invention is described in detail in the following and diagrammatically illustrated in FIG. 1. The numbers used in FIGS. 1, 2a, 2b and 3 have the following meaning:

| | | | | |
|---|---|---|---|---|
| 1 | = | $H_2SO_4$-washer | 8 | = storage vessel for liquid HF |
| 1a | = | $H_2SO_4$-washer | 9 | = HF-containing gases |
| 1b | = | $H_2SO_4$-washer | 10 | = storage vessel for concentrated $H_2SO_4$ |
| 2 | = | $H_2O$-cooler | 11 | = mixing vessel for the charging acid |
| 2a | = | $H_2O$-cooler | 12 | = condensate from 3 |
| 3 | = | HF-washer | 13 | = condensate from 2 |
| 4 | = | $H_2O$-cooler | 14 | = washing acid from 1 |
| 5 | = | brine cooler | 14a | = washing acid from 1a |
| 5' | = | brine cooler | 14b | = washing acid from 1b |
| 6 | = | residual gas washer | 15 | = reactor |
| 7 | = | removal of $SiF_4$ from the waste gas | 16 | = storage container for oleum |
| 7a | = | hydrolyser | 17 | = washing acid from 6 |
| 7b | = | hydrolyser | 18 | = impeller |
| 19 | = | pump | 23 | = washing liquid |
| 20 | = | drop catcher | 24 | = addition of water |
| 21 | = | filter | 25 | = storage vessel for $H_2SiF_6$ |
| 22 | = | separated $SiO_2$ | | |

The crude gas leaving the reactor 15 at a temperature of approximately 150° to 250°C is initially delivered to an $H_2SO_4$-washer 1 for drying the crude gases and for removing the dust-form constituents. The $H_2SO_4$-washer, which comprises an $H_2SO_4$-circuit provided with cooling means, is operated at a temperature of from about 50° to about 120°C so that the purified gases leave the washer with a temperature of from about 60° to 130°C. This stage can also be in the form of a two-stage countercurrent washer (FIG. 2b). The washing acid 14 which has a temperature of from about 50° to 120°C is delivered to the mixing vessel 11. In the second purification stage 2, the gases from the $H_2SO_4$-wash are cooled by indirect heat exchange with water to a temperature of from 30° to 50°C. The condensate from stage 2 is also delivered to the mixing vessel 11 via 13. The gases leaving the $H_2O$-cooler are then cooled in the HF-washer 3 to a temperature of from 20° to 25°C. Cooling is carried out by direct heat exchange with the condensate from stage 4, optionally stage 5 as well, the ratio of liquid HF to gaseous HF being about 0.5 : 1. The condensate from the HF-washer 3 is delivered to the mixing vessel 11 via 12. From stage 3 the gases enter stages 4 and 5 for condensation, the first condensation stage being in the form of an $H_2O$-cooler in which the gases are cooled to the dew point of hydrofluoric acid. This is followed by further cooling, preferably in a two-stage brine cooler 5, 5', to condensate temperatures of from about −15° to +5°C. The resulting condensates are delivered to the storage vessel 8. An acid containing approximately 99.95 % of HF is obtained. Residual content: 0.02 % of $H_2O$, 0.03 % of $SO_2$, 0.001 % of $H_2SO_4$ and traces of $SiF_4$.

As already mentioned, only some of the condensate is delivered to the HF-washer 3. The gases leaving the condensation stage are washed in the residual gas washer 6 with concentrated sulphuric acid which is delivered to the washer from the storage vessel 17 at a temperature of from about 15° to 25°C. The acid is delivered from the residual gas washer to the $H_2SO_4$-wash 1. The waste gas from the residual gas wash 6 is then freed from $H_2SiF_6$ in stage 7. In the mixing vessel 11, the washing acid from stage 1 and the condensates from stages 2 and 3 are concentrated with oleum in order to bind the water absorbed. The concentrated acid is then reacted with calcium fluoride in the reactor 15 in order to produce the crude gas. The gases containing hydrogen fluoride which leave the mixing vessel 11 are delivered through 9 to the $H_2O$-cooler. In another embodiment of the present invention, the HF containing gases leaving 11 can be delivered to another step of the purification system, e.g. between the two $H_2SO_4$-washers 1 a and 1b (confer FIG. 2 b). The water leaving the $H_2O$-cooler 14 is used for charging the $H_2O$-cooler 2. The separation of sulphur takes place for the most part in the $H_2O$-cooler 2 and, to a lesser extent, in the HF-washer 3.

Figure 2A:
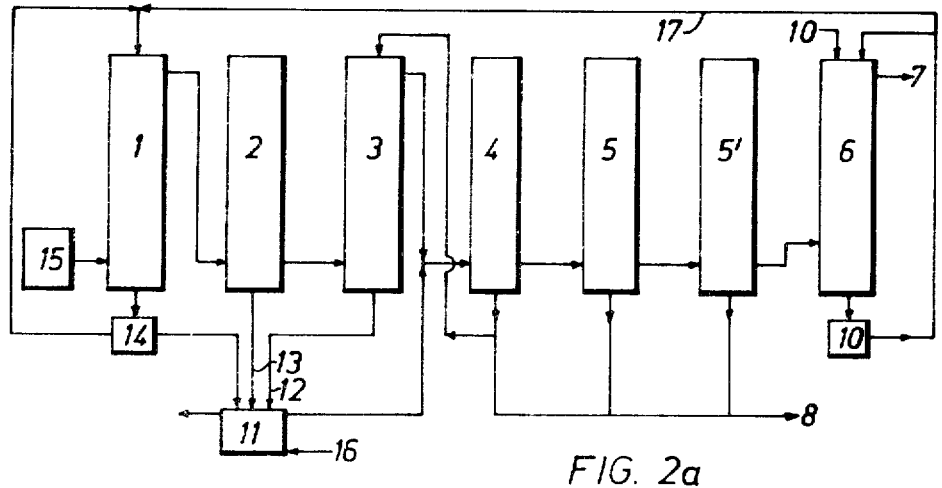
Figure 2B:
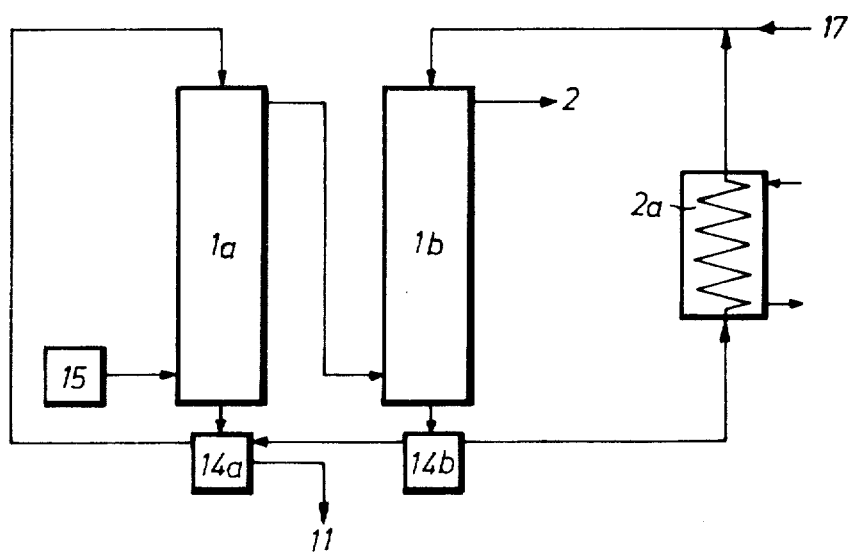

A preferred embodiment of the process according to the invention is shown in FIGS. 2a and 2b. The starting material according to this embodiment is a crude HF-containing gas produced by reacting fluorspar preheated to around 550°C with charging acid 11 preheated to 110°–180°C in stoichiometric quantities. The crude HF gas enters the $H_2SO_4$-washer 1 at a temperature of from about 150° to 250°C. It is primarily the dust-form constituents together with water vapour and droplets of $H_2SO_4$ that are separated off in the $H_2SO_4$-washer 1. The washing acid is circulated by pumping from the receiver 14. At the next purification stage, the gases cooled to 60°–130°C flow through an $H_2O$-cooler 2 which they leave at a temperature of 30° to 50°C. Elemental sulphur is separated off in this cooler and a first condensate 13 accumulates which is enriched with impurities. In the following HF-washer 3, cooling is continued to 20°–25°C, the residual elemental sulphur being separated off. In addition, another condensate 12 enriched with impurities accumulates. The quantity of liquid HF used for cooling is adjusted so that it almost completely evaporates. The condensates enriched with the impurities are not returned to a preceding purification stage, but instead they are delivered together with washing acid from the first purification stage into the mixing vessel 11 in which the charging acid for the reaction kiln 15 is prepared with oleum added from the storage vessel 16. The HF-containing gases evolved as a result of the increase in temperature which occurs are delivered to the $H_2O$-cooler. In this way, the impurities are removed from the purification and condensation system without any loss of HF. At the same time, overlarge quantites of HF are prevented from being circulated in the system as a whole through the hydrofluoric acid kiln.

In another embodiment of the process, the $H_2SO_4$-washer 1 is in the form of a two-stage countercurrent washer (FIG. 2b). In the first washer 1a, the acid is pumped around at a temperature of from 100° to 140°C, the gases leaving the washer at a temperature of 90° to 160°C. In the second washer (1b), the acid is pumped around through a cooler (2a). The cooler is preferably operated with the cooling water flowing out of the $H_2O$-cooler (2). The pump-circulated acid has a temperature of 40° to 70°C and the issuing gas a temperature of 50° to 90°C. The washing acid is delivered to the circuit 1b - 14b - 2a from the residual gas wash 6 and enters the circuit 1a - 14a from the storage vessel 14b.

The following condensation system 4, 5, 5' comprise an $H_2O$-cooler 4 and two brine coolers 5 and 5'. The cooling water from the first condensation stage 4 is further utilised in the $H_2O$-cooler 2 of the purification system. The condensate from the first stage 4 is used as required for the HF-washer 3, and the condensates from the further stages 5 and 5' are run off in the form of high-purity, liquid 99.95 % HF.

The condensation system simultaneously acts as a purification system because it separates the condensed hydrofluoric acid from the inert gases and the silicon tetrafluoride impurities. This residual gas still contains about 3 % of the HF produced during the reaction.

The residual gas, having a temperature of from about −15° to +5°C, can be freed substantially completely from fractions of HF in the residual gas washer 6 using concentrated sulphuric acid from the storage vessel 16. The washing acid can be pumped around from the receiver 17 and is delivered from 6 to the $H_2SO_4$-washer 1 of the first purification stage.

The $SiF_4$ left in the residual gas is delivered to $H_2O$-washers functioning as hydrolysers. In the conventional process for producing hydrofluoric acid, the residual gases, following condensation, are only washed in a sulphuric acid wash to such an extent that the gases leave the final washer with an $SiF_4$:HF molar ratio of about 1 : 2. The gases are delivered to washing towers sprinkled with water. The following reaction takes place:

$$2HF + SiF_4 \rightarrow H_2SiF_6$$

It is possible in this way to obtain a hexafluorosilicic acid with contents of about 45 to 50 %. Depending upon the procedure adopted, this acid contains a certain excess of free hydrofluoric acid.

The silicon dioxide content of flotation spar which has seen a steady increase over recent years necessitates some adaptation of the conventional process. Since the $SiO_2$-contents fluctuate, it is extremely difficult to monitor the ratio of $SiF_4$ to HF during washing. High $SiO_2$-contents cause silicification in the water-sprinkled washing towers. This in turn results in blockages and breaks in production. In order to obviate these difficulties in accordance with the invention, the gases, following condensation, are freed from HF with sulphuric acid to such an extent that substantially only $SiF_4$ can pass the final washer 6. To this end, the final gas washer has to be provided with receivers and pumps, depending upon the spraying density and an optionally cooled sulphuric acid washing circuit. These $SiF_4$-containing gases, freed from HF, are hydrolysed in accordance with the equation:

$$3 SiF_4 + 2 H_2O \rightarrow SiO_2 + 2 H_2SiF_6$$

hydrolysis is preferably carried out in countercurrent in two impeller washers. The quantities of $SiO_2$ which accumulate during hydrolysis are continuously delivered to a rotary filter and removed from the circuit.

The $SiO_2$-residue can be used for another purpose, for example as a filler. The hexafluorosilicic acid accumulating in a quantity of substantially 30 % during the process is advantageously used for the production of fluorides.

This advantageous modification of the process according to the invention affords the following advantages:

a. Silicification of the hydrolysers (7a and 7b) is avoided, thus eliminating the danger of breaks in production.
b. It is possible to process fluor spar with higher $SiO_2$-contents than in the past (less than 1 % of $SiO_2$).
c. HF is saved by virtue of the fact that there is now no longer any need during washing to use stoichiometric quantities of HF and the excess of HF which this involves.
d. HF-emission is reduced. This is achieved by virtue of the fact that apart from free $SiO_2$ only $H_2SiF_6$ is present in the last hydrolyser. In this way free HF is prevented from entering the solution so that the vapour pressure of this solution is reduced.

One advantageous embodiment of the process for removing $SiF_4$ is described in detail in the following with reference to FIG. 3:

The gases freed from HF after the sulphuric acid wash enter the impeller washers (7a and 7b) (hydrolyser). The liquid is dispersed by means of an impeller 18 in such a way that intensive washing is possible.

At the same time, the suspension formed is circulated by the pump 19 in the hydrolyser 7a. Like the impeller, the hydrolyser is provided with a special rubber coating. The gases leave the hydrolyser 7a and enter the hydrolyser 7b. This hydrolyser functions in exactly the same way as the hydrolyser 7a. The gases washed out enter a drop catcher 20 and are freed therein from entrained washing liquid. These residual gases are either discharged into the open or optionally delivered to another washing stage.

Depending upon the working conditions, this hydrolyser installation can be operated in countercurrent with water or with other washing liquids. Cryolite-containing alkaline effluents, for example, can be used as further washing liquids. In this case, filtration may optionally be omitted and the entire suspensions of cryolite, $SiO_2$ and hexafluorosilicic acid can directly be delivered to the processes for producing fluorides, for example cryolite.

In cases where washing is carried out with water, the suspension of hexafluorosilicic acid and $SiO_2$ is delivered from the hydrolyser 7a to the filter 21 in which the $SiO_2$ is separated off in the form of a solid 22. The $SiO_2$ is washed with water 24 on the filter 21. The washing liquid 23 is delivered to the hydrolyser 7a.

The process according to the invention is illustrated by the following Example.

Figure 3:
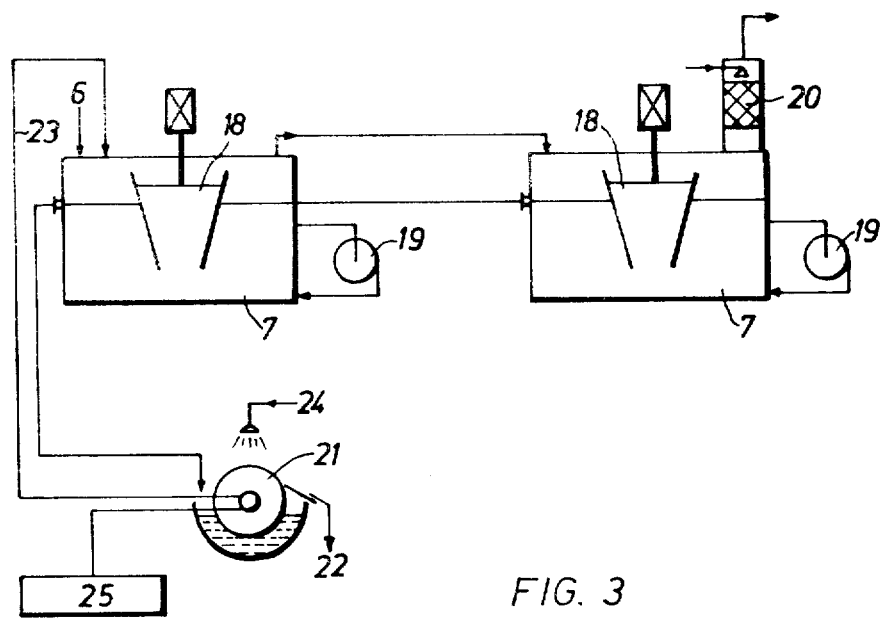

EXAMPLE (FIGS. 2 and 3).

The reaction gases (velocity 1 m³/sec) leave the reaction zone 15 at a temperature of 185°C and enter the washer 1 which has a spraying density of 10 m³/m²/hour for a pump-circulated stream of 8 m³/h, and to which receiver the sulphuric acid coming from the washer 6 is delivered at a temperature of 35°C. As well as SiF$_4$, SO$_2$, H$_2$SO$_4$, water vapour, inert gases and dust-form impurities, the reaction gases primarily contain hydrogen fluoride. It is primarily the dust-form constituents, water vapour and droplets of SO$_3$ and H$_2$SO$_4$ which are separated in the washer 1. At the same time, heat is removed from the gas and the sulphuric acid absorbs HF, the particular quantity being governed by the prevailing temperature. The gases freed from solids enter the water cooler 2 at a temperature of 70° to 90°C. In the water cooler 2, the gases are cooled to 30°C and a large part of the sulphur is separated off. The condensates which accumulate at this temperature are then delivered to the mixer 11. The gases then enter the purification system 3 in the form of an HF-washer in which they are so intensively washed with small quantities of liquid, high-percentage hydrofluoric acid from the first condensation stage 4 (½ kg of liquid HF per kg of gaseous HF) and cooled that residual traces of H$_2$O and of SO$_3$ and H$_2$SO$_4$-droplets are separated off and the gases further cooled to around 21°C. The procedure is such that the entire quantity of HF sprayed in is evaporated and any impurities still present accumulate as condensate. This condensate is delivered to the mixer 11. The gases enter the water cooler 4 of the condensation system 4, 5 and 5' at a temperature of approximately 21°C. The water leaving the cooler 4 is delivered to the cooling stage 2. The liquid hydrogen fluoride accumulating in the condensation system 4, 5, 5' contains approximately 99.95 % of HF, <0.02 % of H$_2$O, <0.03 % of SO$_2$, <0.001 % of H$_2$SO$_4$ and traces of SiF$_4$.

The gases leaving the condensation system 4, 5, 5' (primarily inert gas and SiF$_4$) are freed from residual HF in a sulphuric acid washer (H$_2$SO$_4$ temperature 20°C) and enter an H$_2$O-afterwashing stage at 35°C for the separation of SiF$_4$—H$_2$SiF$_6$. The quantities of elemental sulphur which accumulate in the system at stages 2 and 3 are purified after the gaseous stream has been switched to a parallel system by heating with steam [indirectly at stage 2, directly at stage 3].

SO$_3$ is added to the sulphuric acid in 11 in such a quantity that a temperature of approximately 120°C and a water content of approximately 4 % are obtained.

The SiF$_4$-containing gases leaving the residual gas washer 6 are delivered to the hydrolysers 7a and 7b arranged in series. The water required for washing and for hydrolysis enters the system through the drop catcher 20 and flows through the two hydrolysers 7a and 7b against the gas stream. The suspension of SiO$_2$ in hexafluorosilicic acid which is formed is removed from the hydrolyser 7a and delivered to the drum filter 21. The H$_2$SiF$_6$-solution which is separated off at this point is introduced into the storage vessel 25. Following an afterwash with water, the SiO$_2$-filter cake 22 is removed with a residual moisture content of approximately 90 %. The washing liquid 23 formed is returned to the hydrolyser 7a. The total quantities of water delivered to the drop catcher 20 and the filter 21 are regulated so that an approximately 32 % H$_2$SiF$_6$-solution is formed.

What is claimed is:

1. A process for recovering hydrogen fluoride from a mixture comprising hydrogen fluoride, SiF$_4$, SO$_2$, H$_2$SO$_4$, water vapor, inert gases and dust form impurities which comprises washing said mixture at a temperature of about 150° to about 250°C., in a first stage, with 95 to 99% sulfuric acid at a temperature of about 50 to 120°C. to thereby cool said mixture to a temperature of about 60° to 130°C., cooling residual gaseous mixture from said first stage, in a second stage, to a temperature of about 30° to 50°C. by indirect heat exchange with water, cooling residual gaseous mixture from said second stage, in a third stage, to a temperature from about 20° to about 25°C. by direct heat exchange with high purity liquid hydrogen fluoride, the ratio of liquid hydrogen fluoride used for direct heat exchange to gaseous hydrogen fluoride being cooled being from about 0.5:1 to about 1:1, cooling the residual gaseous mixture from said third stage to the dew point of hydrofluoric acid, in a fourth stage, to thereby condense hydrogen fluoride, cooling residual gaseous mixture from said fourth stage, in a fifth stage, to a temperature of from about −15° to 5°C. to thereby produce condensed hydrogen fluoride and a residual gaseous effluent and recovering condensed hydrogen fluoride produced in said fourth and fifth stages.

2. The process of claim 1 wherein the cooled gaseous product of said first stage is at a temperature from 70° to 90°C.

3. The process of claim 1 wherein water is employed as the condensing agent in the fourth stage and said water is then employed as the cooling agent in said second stage.

4. The process of claim 1 wherein the first stage is operated in the form of a two stage countercurrent washer with a sulfuric acid temperature of from 100° to 140°C. in the first stage countercurrent washer and from 40° to 70°C. in the second stage countercurrent washer.

5. The process of claim 1 wherein residual gaseous effluent from said fifth stage is washed with 95–99% sulfuric acid in a sixth stage to recover residual hydrogen fluoride therein.

* * * * *